United States Patent

[11] 3,620,474

[72] Inventor Robert C. Ray
North Hollywood, Calif.
[21] Appl. No. 814,973
[22] Filed Apr. 10, 1969
[45] Patented Nov. 16, 1971
[73] Assignee Bell & Howell Company
Chicago, Ill.

[54] SELF-LOADING TAKEUP REEL
14 Claims, 3 Drawing Figs.

[52] U.S. Cl. 242/195, 242/71.8, 242/74
[51] Int. Cl. G11b15/66, B65h 75/28
[50] Field of Search 242/195, 71.8, 74, 74.1, 74.2, 68.3

[56] References Cited

UNITED STATES PATENTS

| | | | |
|---|---|---|---|
| 2,015,860 | 10/1935 | May | 242/71.8 A X |
| 3,150,840 | 9/1964 | Briskin et al. | 242/195 |

OTHER REFERENCES

Dombroski, " Flexible Tape Reel" IBM Technical Disclosure Bulletin Vol. 5, No. 1 Pg. 11 June 1962

*Primary Examiner*—George F. Mautz
*Attorney*—David Weiss

ABSTRACT: A self-loading takeup reel for use in a tape transport which is provided with a supply tape having a relatively stiff leader wider than the tape attached to one end. The reel has a flexible flange attached to one side of the hub which resiliently biases the leader against a preferably rigid flange when the leader is received between the flanges.

PATENTED NOV 16 1971

3,620,474

Robert C. Ray,
INVENTOR.
BY
David Ness
ATTORNEY.

Robert C. Ray,
INVENTOR.
BY.

ATTORNEY.

SELF-LOADING TAKEUP REEL

BACKGROUND OF THE INVENTION

1. Field of the Invention

This invention relates to web transport apparatus, and more particularly to an improved takeup reel for receiving a driven tape leader and for automatically producing winding engagement therewith.

2. Description of the Prior Art

In web transport apparatus having means for automatically threading an end of a supply web (such as magnetic tape, paper tape or photographic film, wound on a supply reel) along a predetermined transport path, a web takeup reel of the "self-loading" type is generally included, i.e. a takeup reel for receiving the driven web end and for automatically producing winding engagement therewith. Where the web lacks structural stiffness (such as conventional, limp magnetic tape), a "relatively stiff leader" (i.e., a leader having sufficient stiffness to resist applied longitudinal and transverse forces usually encountered in automatic threading systems, but having sufficient flexibility to permit winding of the leader) is normally attached to the tape end, and the leader is driven to a position for being received by the takeup reel.

One type of self-loading takeup reel of the prior art, often included in magnetic tape recording and playback apparatus having an automatic threading capability, comprises a pair of rigid flanges positioned on either side of a hub, only one of the flanges being fixedly attached to the hub. The other rigid flange is coupled to the hub for rotation therewith, but floats with respect to the side of the hub; such a reel includes spring means for normally biasing the floating flange against the hub.

The distance between the two flanges in the vicinity of the hub is slightly less than the width of the leader. A face of at least one of the flanges is peripherally recessed, however, so that the distance therebetween is greater than the width of the leader to permit entry of the leader. The flange face may be further shaped to effect a smooth lateral transportation of the leader from its entry to a more centralized "interfering" portion of the reel. As used herein, an "interfering" portion of the reel exists where the distance between the flanges is less than the width of the leader.

In operation, the relatively stiff leader (which is wider than the attached magnetic tape) is driven or pushed along the transport path, for example by controlled rotation of the supply reel. As the leader approaches the takeup reel to be received between the recessed portions of the flanges, the takeup reel is caused to rotate by suitable actuation of a coupled motor means. When the leader approaches the interfering portion of the rotating reel, the stiff leader urges the floating flange against its already biased spring means, and the floating flange is therefore caused to move in a direction for accommodating the width of the leader while biasing the leader against the fixedly attached flange.

The resulting frictional "grasping" of the leader's edges by the rotating flanges, together with a resulting or applied drag force on the leader, drives the leader toward the hub. Continued rotation of the takeup reel causes the leader to be pressed against and to be wound about the hub.

Variations of this type of self-loading takeup reel are available in the prior art. For example, one type of variation includes means for locking the floating flange from further lateral movement after the leader is wound about the hub. Another variation provides circular grooves on the flanges in the vicinity of the hub, for receiving and retaining the edges of the leader, permitting the floating flange to be completely biased against the hub side during the tape takeup.

Although it has been generally experienced that such self-loading takeup reels of the prior art perform satisfactorily in operation, the provision of a floating rigid flange presents certain disadvantages. For example, since floating assemblies must include relatively moveable parts, they tend to be somewhat complex in construction, and usually require closely maintained tolerances for controlling uniform movement of the flange during loading.

SUMMARY OF THE INVENTION

The self-loading takeup reel of the present invention operates in accordance with the general principles described above, without, however, the provision therein of a floating rigid flange. The present takeup reel comprises a hub, a preferably rigid flange fixedly attached to one side of the hub, and a resiliently flexible flange having a central portion which is fixedly attached to the other side of the hub. The flexible flange resiliently biases the relatively stiff leader against the rigid flange when the leader is received therebetween. The distance between the flanges in the vicinity of the hub is normally less than the width of the leader but can be greater than the width of the tape.

Since the self-loading takeup reel of the present invention does not include relatively moveable parts, the disadvantages of the floating flange assemblies of the prior art reels are avoided. The installation of the resiliently flexible flange on the hub is a simple procedure, and the reel does not require assembly or maintenance adjustments. In addition to an increased inherent operational reliability, the present self-loading takeup reel provides obvious manufacturing economies over the floating flange reels of the prior art.

BRIEF DESCRIPTION OF THE DRAWINGS

The novel features which are believed to be characteristic of the invention, together with further advantages thereof, will be better understood from the following description considered in connection with the accompanying drawings in which a preferred embodiment of the invention is illustrated by way of example. It is to be expressly understood, however, that the drawings are for the purpose of illustration and description only, and are not intended as a definition of the limits of the invention.

DESCRIPTION OF THE PREFERRED EMBODIMENT

Figure 1:
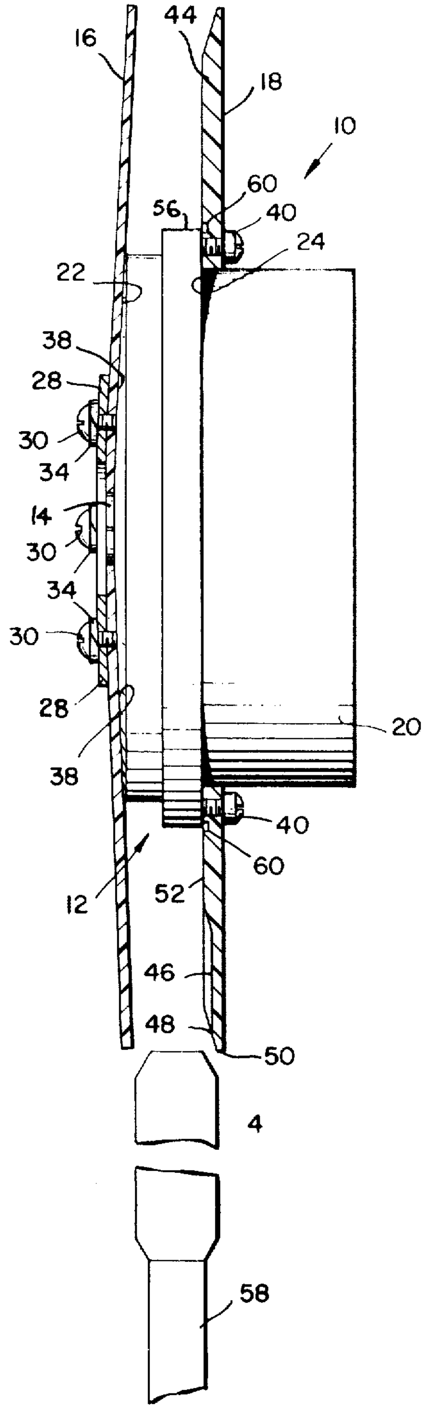
FIG. 1 is a side part-section, part-elevation view of a preferred embodiment of a self-loading takeup reel in accordance with the present invention.

Turning first to FIG. 1, a preferred embodiment of a self-loading takeup reel 10 includes a hub 12 which is adapted to be mechanically coupled to a drive spindle of a tape transport system (not shown), for example by a centrally located split sleeve 14 cooperating with a collar clamp (not shown). Accordingly, the hub 12 rotates about its longitudinal axis when driven by the drive spindle.

As used herein, the hub 12 is defined as the reel portion situated between a first side flange 16 and a second side flange 18, and a hub sleeve 20 can be provided which is integral with the hub 12. As thus defined, the hub 12 includes a first side 22 and a second side 24.

Figure 2:
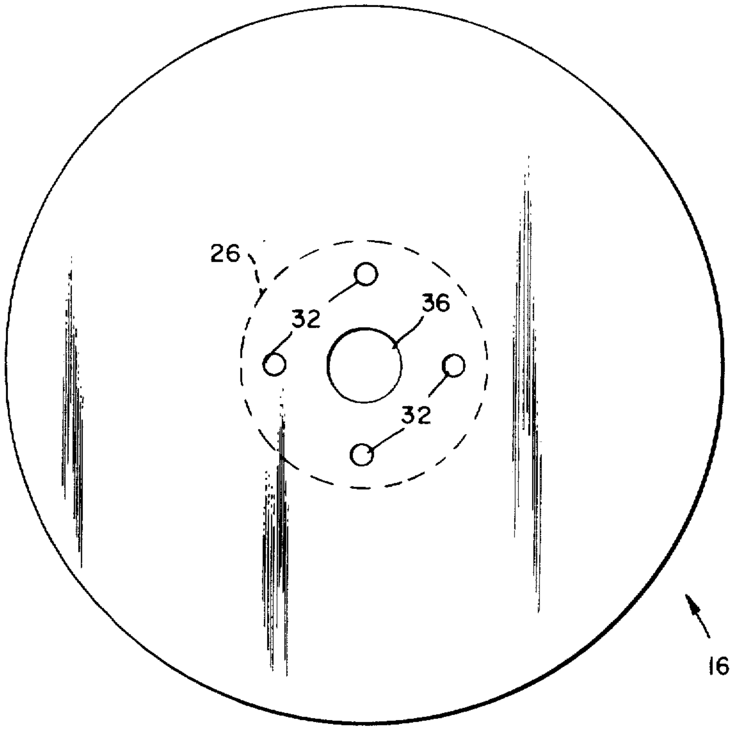
FIG. 2 is a front view of a resiliently flexible flange member of the reel shown in FIG. 1, before assembly with the hub.
Figure 3:
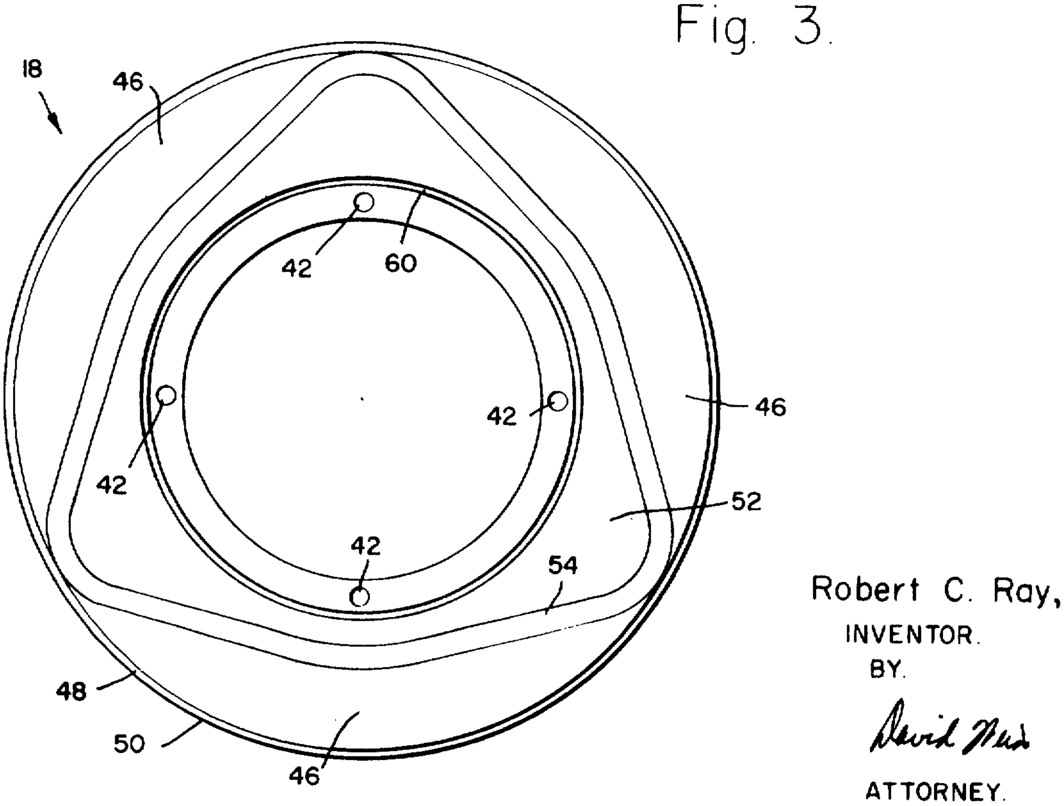
FIG. 3 is a front view of the rigid flange member of FIG. 1 before assembly with the hub.

The first side flange 16 (better shown in FIG. 2) is fabricated from a thin, flexible and resilient sheet material, such as a plastic. In one example, it has been experienced that sufficient flexibility and resilience for practicing the present invention is provided when a plastic sheet material sold under the trademark "Lexan" is used. In this example, the flexible flange 16 had a nominal thickness of 0.030 inch, a diameter of 5 inches, and a central portion 26 (delineated in phantom) having a diameter of 1.5 inches was fixedly secured to the hub's first side 22 by means of a cover plate or washer 28 in pressing contact therewith (FIG. 1). The cover plate 28 and the flexible flange 16 can be secured to the hub's first side 22 by means of screws 30 extending through apertures 32 in the flexible flange 16, and through correspondingly positioned apertures in the cover plate 28, and threadably received by the hub 12; locking washers 34 can further be provided. The flexible flange 16 can include a center aperture 36, for avoiding interference with the split sleeve 14.

In the preferred embodiment, the resiliently flexible flange 16 is biased toward the rigid side flange 18, as shown (albeit somewhat exaggeratedly) in FIG. 1. For example, the hub's first side 22 can be shaped in such manner as to positively cause the flexible member 16 to slope toward the rigid member 18 when the cover plate 28 is installed. As shown in FIG. 1, the hub's first side 22 is tapered from its circumference toward its center, the tapered face portion 38 extending under the cover washer 28 which conforms to the generally conically tapered portion 38 when the screws 30 and locking washers 34 are installed.

Although the second flange 18 can be resiliently flexible, it is preferred that the second flange 18 be rigid (at least in relation to the first flange 16). Such a rigid flange 18 (better shown in FIG. 4) is fixedly attached to the hub's second side 24, for example by means of screws 40 extending through apertures 42 in the rigid flange 18 and threadably received by the hub 12. The rigid flange 18 includes an operative surface 44 facing the flexible flange 16, which is shaped to receive an end of a driven stiff leader 46 and to transversely coerce the received leader 46 toward the flexible flange 16. For example, the rigid flange's operative surface 44 can include relatively recessed portions 46 adjoining a chamfer 48 along the rigid flange's circumference 50. The operative surface 44 further includes an interfering portion 52, spaced from the flexible flange 16 such that the flexible flange 16 will be in biasing contact with the stiff leader 46 when the stiff leader is in contact engagement with the rigid flange interfering portion 52. A smooth transition portion 54 is provided between the operative surface's recessed and interfering portions 46, 54.

Returning to FIG. 1, the hub 12 includes a cylindrical surface 56 about which the stiff leader 46 is to be wound. As indicated in FIG. 1, the width of the cylindrical surface 56 need not extend throughout the width of the hub 12. The distance between the two flanges 16, 18, however, at the cylindrical surface 56 is slightly less than the width of the stiff leader 46, and in the preferred embodiment is greater than the width of the magnetic tape 58 which is attached to the leader 46. If desired, the rigid flange 18 can include a shallow groove 60 at the cylindrical surface 56 for assuring that the end of the leader 46 is retained against the hub 12.

It will be recognized that the magnitude of the biasing force developed in the flexible flange 16 at the circumference of the hub's cylindrical surface 56 depends upon the diameter of the cover plate 28 in relation to the diameter of the hub's cylindrical surface 56. Furthermore, the magnitude of the biasing force decreases as the moment arm is increased, i.e. with radial distance from the circumference of the cover plate 28. This radially varying biasing force facilitates entry of the stiff leader 46 between the flanges 16, 18 while assuring retention of the leader in the vicinity of the hub 12.

Prior to operation, the self-loading takeup reel 10 is installed in the tape transport system. In operation, the stiff leader 46 is driven along the predetermined transport path, and enters the space between the peripheries of the two flanges 16, 18. The takeup reel 10 is thereupon caused to rotate (upon automatic actuation by suitable switch means) in a tape-winding direction. As the stiff leader 46 continues along its path, the rotation of the reel 10 causes an edge of the leader 46 to be drawn upon the interfering portion 52 of the rigid flange 18, transversely moving the leader 46 (to the left as shown in FIG. 1) against the flexible flange 16 which flexes to accommodate the width of the leader 46. The biasing force developed by the flexible flange 16 and which is exerted against the leader 46, causes the leader's edges to be frictionally grasped or retained by the rotating flanges 16, 18 which are moving faster than the speed with which the leader 46 is being driven. The edges of the leader 46 radially slide along the flexible flange 16 and the rigid flange's interfering portion 52, so that the leader 46 is urged toward the hub's cylindrical surface 56 (and if the groove 60 is provided, the end of the leader 46 is "trapped" therein). The stiff leader 46 presses against the hub's cylindrical surface 56, and is wound thereupon.

Since the flexible flange 16 is exerting a transverse force upon the wound leader 46, the leader remains secured between the two flanges 16, 18 when rotation of the takeup reel 10 ceases. The distance between the two flanges 16, 18 at the hub's cylindrical surface 56, of course, is equal to the width of the stiff leader 46 positioned therebetween, while the distance between the two flanges 16, 18 at their peripheries should be greater than the width of the tape 58. During reverse rotation of the takeup reel 10 while the leader 46 is being driven in a reverse direction (toward the supply reel), the leader 46 easily disengages from its position at the hub 12 and is withdrawn from the takeup reel 10.

Thus, there has been shown a preferred embodiment of an improved self-loading takeup reel for inclusion in a tape transport apparatus, for receiving a driven tape leader and for automatically producing winding engagement therewith. Other embodiments and modifications of the embodiment herein presented may be developed without departing from the essential characteristics thereof.

Accordingly, the invention should be limited only by the scope of the claims listed below.

What is claimed is:

1. A takeup reel for use in a tape transport providable with supply tape having a relatively stiff leader wider than the tape attached to an end thereof, comprising the combination of:
   - a hub; and
   - first and second flanges having respective portions fixedly secured to opposite sides of said hub such that the distance between said flanges in the vicinity of said hub is normally less than the width of the leader, at least one of said flanges being resiliently flexible for varying said distance in such manner that the leader is frictionally retained by said flanges when the leader is received therebetween.

2. A takeup reel for use in a tape transport providable with supply tape having a relatively stiff leader wider than the tape attached to one end thereof, comprising the combination of:
   - a hub having a cylindrical surface;
   - a rigid side flange attached to a side of said hub; and
   - a resiliently flexible side flange having a central portion fixedly attached to the other side of said hub;
   - said side flanges being separated at the circumference of said cylindrical surface by a distance normally less than the width of the leader.

3. A self-loading takeup reel for use in a tape transport providable with supply tape having a relatively stiff leader wider than the tape attached to an end thereof, comprising the combination of:
   - a hub;
   - a rigid side flange attached to a side of said hub; and
   - a flexible side flange having a portion fixedly attached to the other side of said hub for resiliently urging the leader against said rigid side flange when the leader is received therebetween.

4. A takeup reel for use in a tape transport providable with supply tape having a relatively stiff leader wider than the tape attached to an end thereof, comprising the combination of:
   - a hub;
   - a rigid side flange attached to a side of said hub; and
   - a flexible side flange having a portion fixedly attached to the other end of said hub and resiliently biased toward said rigid side flange.

5. A self-loading takeup reel for use in a tape transport providable with supply tape having a relatively stiff leader wider than the tape attached to an end thereof, comprising the combination of:
   - a hub having a cylindrical surface and a side face;
   - a resiliently flexible flange member having a central portion fixedly attached to said face concentrically within the circumference of said cylindrical surface and at a predetermined radial distance therefrom; and
   - a rigid flange member fixedly attached to said hub such that the distance between said flange members at said circumference is normally less than the width of the leader.

6. The takeup reel according to claim 5, above, wherein aid distance is greater than the width of the tape.

7. The takeup reel according to claim 5, above, wherein said resiliently flexible flange member is normally biased toward said rigid flange member.

8. The takeup reel according to claim 5, above, wherein said side face is outwardly tapered toward its center.

9. A self-loading takeup reel for use in a tape transport providable with supply tape having a relatively stiff leader wider than the tape attached to an end thereof, comprising the combination of:

a hub having a cylindrical surface and a side face;

a resiliently flexible flange member;

means fixedly attaching a central portion of said resiliently flexible flange member to said face concentrically within the circumference of said cylindrical surface and at a predetermined radial distance therefrom; and a rigid flange member attached to said hub such that the distance between said flange members at said circumference is normally less than the width of the leader.

10. The takeup reel according to claim 9, above, wherein said resiliently flexible flange member is normally biased toward said rigid flange member.

11. In tape transport apparatus including a supply reel provided with supply tape having an end to which a relatively stiff leader is attached, and further including means for driving the leader along a transport path; a takeup reel for receiving the driven leader and for producing winding engagement therewith, comprising the combination of:

a hub having a cylindrical surface;

a rigid side flange attached to a side of said hub; and a resiliently flexible side flange having a central portion fixedly attached to the other side of said hub;

said side flanges being separated at the circumference of said cylindrical surface by a distance normally less than the width of the leader.

12. In a self-loading takeup reel including a hub and a first side flange member attached to a side of the hub;

a resiliently flexible second side flange member having a central portion adapted to be attached to the other side of the hub; and means for fixedly attaching said central portion to said other side of the hub such that said second flange member is normally biased toward the first flange.

13. In a self-loading takeup reel including a hub and a first side flange member attached to a side of the hub;

a resiliently flexible second side flange member having a central portion fixedly attached to the other side of the hub such that said second flange member is biased toward the first flange member.

14. The second flange member according to claim 13, above, being a disc of resiliently flexible plastic material, wherein said central portion is concentric within the circumference of said disc at a predetermined radial distance therefrom.